(12) United States Patent
Daikokuya et al.

(10) Patent No.: US 8,601,312 B2
(45) Date of Patent: Dec. 3, 2013

(54) STORAGE APPARATUS, CONTROLLER, AND METHOD FOR ALLOCATING STORAGE AREA IN STORAGE APPARATUS

(75) Inventors: Hidejirou Daikokuya, Kawasaki (JP); Kazuhiko Ikeuchi, Kawasaki (JP); Chikashi Maeda, Kawasaki (JP); Norihide Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 352 days.

(21) Appl. No.: 13/015,756

(22) Filed: Jan. 28, 2011

(65) Prior Publication Data

US 2011/0191629 A1 Aug. 4, 2011

(30) Foreign Application Priority Data

Feb. 3, 2010 (JP) .................................. 2010-22533

(51) Int. Cl.
*G06F 11/00* (2006.01)

(52) U.S. Cl.
USPC ........................................ 714/6.2; 714/6.13

(58) Field of Classification Search
USPC .................. 714/6.13, 6.2, 6.22, 6.3
See application file for complete search history.

(56) References Cited

U.S. PATENT DOCUMENTS

| | | | | |
|---|---|---|---|---|
| 5,754,756 | A * | 5/1998 | Watanabe et al. | 714/6.21 |
| 6,052,759 | A * | 4/2000 | Stallmo et al. | 711/114 |
| 7,447,837 | B2 * | 11/2008 | Watanabe | 711/114 |
| 7,797,485 | B2 * | 9/2010 | Kirnasov et al. | 711/112 |
| 8,370,688 | B2 * | 2/2013 | Mazina et al. | 714/42 |
| 8,453,011 | B2 * | 5/2013 | Kawaguchi et al. | 714/6.3 |
| 2004/0205145 | A1 | 10/2004 | Murakami et al. | |
| 2005/0210098 | A1 | 9/2005 | Nakamichi et al. | |
| 2005/0257083 | A1 * | 11/2005 | Cousins | 714/6 |
| 2006/0107017 | A1 * | 5/2006 | Serizawa et al. | 711/170 |
| 2007/0233993 | A1 | 10/2007 | Kato et al. | |
| 2007/0234111 | A1 * | 10/2007 | Soran et al. | 714/7 |
| 2008/0109601 | A1 * | 5/2008 | Klemm et al. | 711/114 |
| 2008/0126839 | A1 * | 5/2008 | Sangapu et al. | 714/5 |
| 2009/0049236 | A1 | 2/2009 | Kinoshita | |
| 2009/0125680 | A1 | 5/2009 | Ninose et al. | |
| 2009/0271589 | A1 * | 10/2009 | Karpoff et al. | 711/170 |
| 2010/0251012 | A1 * | 9/2010 | Zwisler et al. | 714/7 |

FOREIGN PATENT DOCUMENTS

| | | |
|---|---|---|
| JP | 2004-246770 A | 9/2004 |
| JP | 2005-266933 A | 9/2005 |
| JP | 2007-265270 | 10/2007 |
| JP | 2009-048612 | 3/2009 |
| JP | 2009-116783 A | 5/2009 |

* cited by examiner

Primary Examiner — Marc Duncan
(74) Attorney, Agent, or Firm — Fujitsu Patent Center

(57) ABSTRACT

A storage apparatus for storing data includes a plurality of physical media provided with storage areas to store data, a storage group determining unit configured to determine, upon detecting a request to write new data to a virtual volume to be accessed, a storage group from which to allocate storage area by selecting a storage group from among a plurality of storage groups made up of the plurality of physical media, wherein the selected storage group is other than any storage groups that include a physical medium where a failure has occurred, and a storage area allocator configured to allocate storage area on the physical media existing within the storage group that was determined by the storage group determining unit to the virtual volume, the size of the storage area corresponds to the data size of the new data.

9 Claims, 13 Drawing Sheets

FIG. 3

| | | | | 214a |
|---|---|---|---|---|
| RAID GROUP NUMBER | ASSIGNED POOL NUMBER | RAID LEVEL | NUMBER OF MEMBER DISKS | MEMBER DISKS |
| G0 | P0 | RAID5 | 8 | D11,D12,D13,D14,D15,D16,D17,D18 |
| G1 | P0 | RAID5 | 8 | D21,D22,D23,D24,D25,D26,D27,D28 |
| G2 | P1 | RAID1 | 2 | D41,D43 |
| G3 | P1 | RAID1 | 2 | D42,D44 |
| G4 | P1 | RAID1 | 2 | D45,D47 |
| G5 | P1 | RAID1 | 2 | D46,D48 |

(Columns: 214a1, 214a2, 214a3, 214a4, 214a5)

FIG. 4

| ASSIGNED POOL NUMBER | RAID GROUP NUMBER | RAID GROUP STATUS | ALLOCATED STORAGE AREA SIZE (BLOCKS) |
|---|---|---|---|
| P1 | 2 | 1 | 1046528 |
| P1 | 4 | 1 | 1048576 |
| P1 | 3 | 1 | 1048576 |
| P1 | 5 | 0 | 1048576 |

FIG. 8

| FAILED RAID GROUP DATA BLOCK INFORMATION 214c1 | | | RECOVERY DESTINATION RAID GROUP DATA BLOCK INFORMATION 214c2 | | |
|---|---|---|---|---|---|
| RAID GROUP NUMBER | DISK NUMBER | REAL ADDRESS | RAID GROUP NUMBER | DISK NUMBER | REAL ADDRESS |
| G0 | D11 | 0x1000 | G3 | D21 | 0x5000 |
| G0 | D11 | 0x1001 | G3 | D21 | 0x5001 |
| ⋮ | ⋮ | ⋮ | ⋮ | ⋮ | ⋮ |

214c

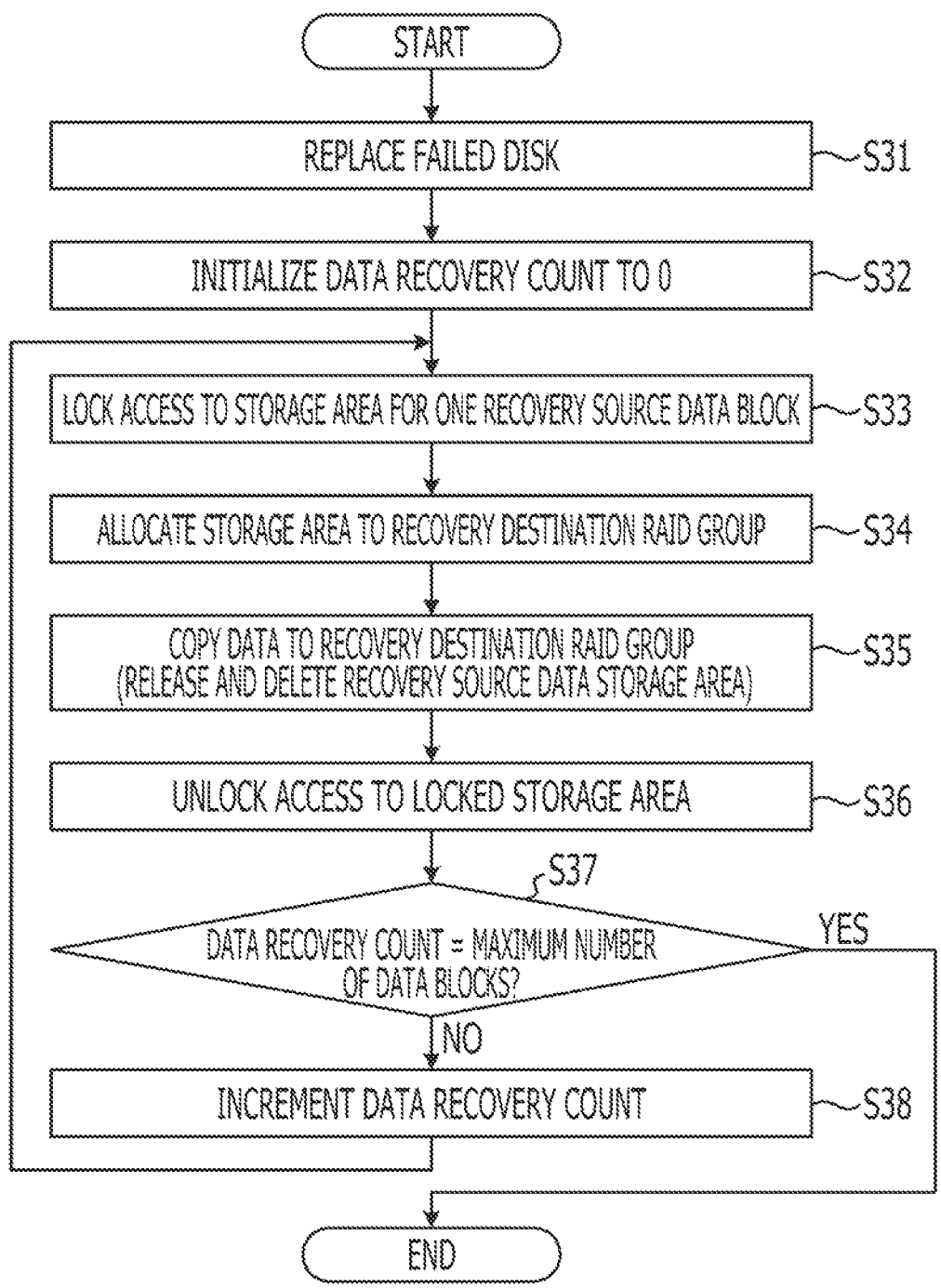

STORAGE APPARATUS, CONTROLLER, AND METHOD FOR ALLOCATING STORAGE AREA IN STORAGE APPARATUS

CROSS-REFERENCE TO RELATED APPLICATION

This application is related to and claims the benefit of priority to Japanese Patent Application No. 2010-022533, filed on Feb. 3, 2010, the entire contents of which are incorporated herein by reference.

FIELD

Embodiments discussed herein relate to a storage apparatus, a storage apparatus controller, and a method for allocating storage area in a storage apparatus.

BACKGROUND

RAID (Redundant Array of Independent Disks) technology is becoming more prevalent for the purpose of increasing the reliability of storage apparatus. In recent years, storage apparatus equipped with RAID and thin provisioning have been adopted in order to reduce storage area and management costs.

With thin provisioning, a storage apparatus provides a virtual volume in the form of virtual storage area having a volume recognized by a host apparatus. Subsequently, when a write request has been issued from the host apparatus, the storage apparatus associates physical storage area with just the locations inside the virtual volume where data was allocated by the write request. The amount of physical storage area corresponds to the size of that data. In other words, the storage apparatus specifies a RAID group for each location inside the virtual volume, and allocates storage area to the disks inside the specified RAID group. The method for allocating physical storage area for each location might be controlled by the storage apparatus such that the sizes of already-allocated storage areas become evenly distributed among the RAID group.

However, if the disk storage areas allocated to locations inside the virtual volume by the storage apparatus are storage areas inside a RAID group that includes one or more damaged disks, there is a problem of reduced access performance for the storage apparatus as a whole. In other words, when allocating physical storage area to the virtual volume, the storage apparatus specifies a RAID group so as to evenly distribute the allocation size, without checking the state of each RAID group. For this reason, if the storage area allocated to the virtual volume is storage area from a RAID group that hypothetically includes one or more damaged disks, then when that RAID group is subsequently accessed, extra load will be incurred on the access processes, and response will be slower. As a result, the average response of the storage apparatus as a whole will be degraded.

SUMMARY

According to an aspect of the embodiment, a storage apparatus for storing data includes a plurality of physical media provided with storage areas to store data, a storage group determining unit configured to determine, upon detecting a request to write new data to a virtual volume to be accessed, a storage group from which to allocate storage area by selecting a storage group from among a plurality of storage groups made up of the plurality of physical media, wherein the selected storage group is other than any storage groups that include a physical medium where a failure has occurred, and a storage area allocator configured to allocate storage area on the physical media existing within the storage group that was determined by the storage group determining unit to the virtual volume, the size of the storage area corresponds to the data size of the new data.

The object and advantages of the embodiment will be realized and attained by the elements, features, and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 illustrates one example of the data structure in a RAID management table;

FIG. 4 illustrates one example of the data structure in a list table;

FIG. 8 illustrates one example of the data structure in a RAID group recovery management table;

FIG. 13 is a flowchart illustrating a data re-recovery processing sequence in accordance with Embodiment 4.

DESCRIPTION OF EMBODIMENTS

Hereinafter, embodiments of the storage apparatus, storage apparatus controller, and method for allocating storage area in a storage apparatus disclosed in the present application will be described in detail and on the basis of the drawings. In the embodiments herein, the storage apparatus is described as being equipped with thin provisioning functions. However, it should be appreciated that the invention is not limited to such embodiments.

Embodiment 1

Figure 1:
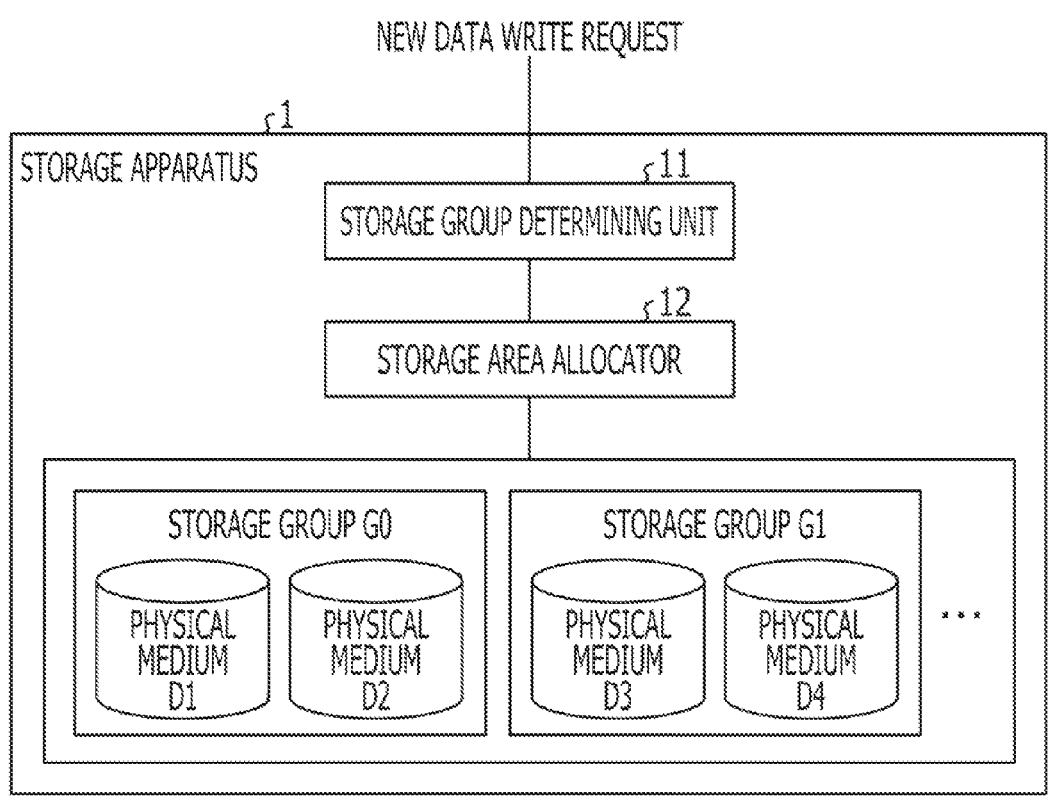
FIG. 1 is a function block diagram illustrating the configuration of a storage apparatus in accordance with Embodiment 1.

FIG. 1 is a function block diagram illustrating the configuration of a storage apparatus in accordance with Embodiment 1. As illustrated in FIG. 1, the storage apparatus 1 is provided with a storage group determining unit 11, a storage area allocator 12, and physical media D. The physical media D are provided with storage areas for storing data.

The storage group determining unit 11 detects a request to write new data to a virtual volume to be accessed. Then, from among a plurality of storage groups G made up of respective pluralities physical media D, the storage group determining unit 11 selects a storage group G that is other than any storage groups G including a failed physical medium D. The selected storage group is determined to be the group from which to allocate storage area.

The storage area allocator 12 allocates storage area to a virtual volume. The allocated storage area belongs to the physical media D existing within the storage group G that was determined by the storage group determining unit 11, and corresponds to the data size of the new data specified in the write request. Herein, the virtual volume is a thin provisioning volume, and is a virtual storage area with respect to the computer or other data processing apparatus that issued the write request.

In this way, the storage apparatus 1 is configured such that, when the storage area of a physical medium D is allocated to a virtual volume, the storage area allocated to the new data does not belong to a physical medium in a storage group G that includes damaged physical media D. For this reason, the storage apparatus 1 is able to curtail increases in access frequency with respect to storage groups G that include damaged physical media D, and is thus able to reduce the load on access processes with respect to such storage groups G. As a result, the storage apparatus 1 is able to curtail increases in the processing time that may be required due to the load on the access processes, and is thus able to substantially prevent reductions in the access performance for the storage apparatus 1 as a whole.

Herein, the storage apparatus 1 in accordance with Embodiment 1 is described as an apparatus having a thin provisioning virtual volume. However, the storage apparatus 1 may also be a RAID (Redundant Array of Independent Disks) apparatus having a thin provisioning virtual volume. Thus, in Embodiment 2, a RAID apparatus having a thin provisioning virtual volume will be described.

Embodiment 2

[Configuration of RAID Apparatus in Accordance with Embodiment 2]

Figure 2:
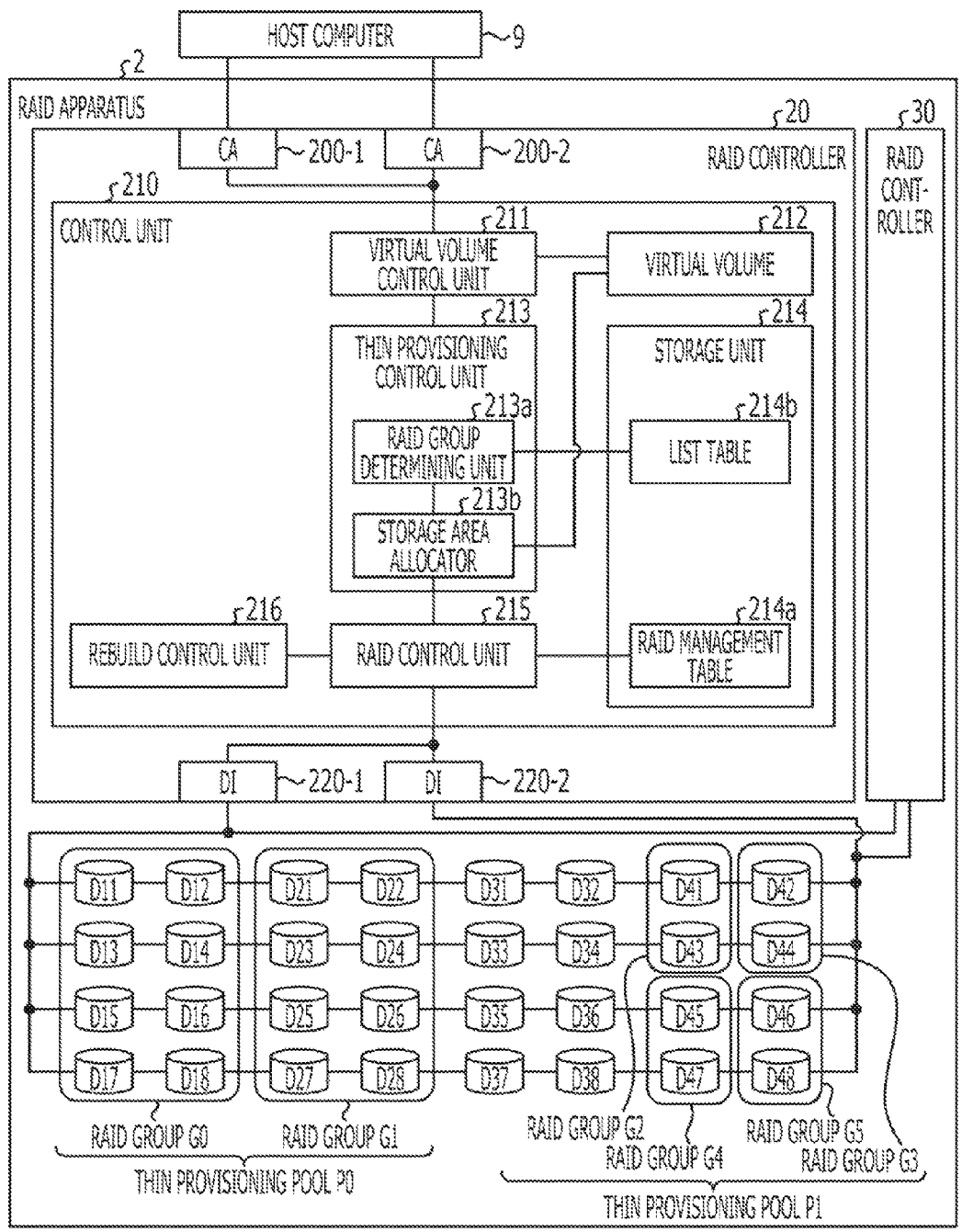
FIG. 2 is a function block diagram illustrating the configuration of a RAID apparatus in accordance with Embodiment 2.

FIG. 2 is a function block diagram illustrating the configuration of a RAID apparatus 2 in accordance with Embodiment 2. As illustrated in FIG. 2, the RAID apparatus 2 includes RAID controllers 20 and 30, and disks D which function as storage disks, also referred to as storage. The RAID controllers 20 and 30 are respectively connected to the disks D. Herein, the RAID apparatus 2 is illustrated as a small-scale RAID apparatus having two RAID controllers, but a medium-scale RAID apparatus with four RAID controllers, or a large-scale RAID apparatus with eight RAID controllers may be similar.

Herein, the disks D included in the RAID apparatus 2 are grouped into RAID groups. In the example illustrated in FIG. 2, the eight disks D11 to D18 constitute a single RAID group G0, while the eight disks D21 to D28 constitute a single RAID group G1. In addition, the two disks D41 and D43, the two disks D42 and D44, the two disks D45 and D47, and the two disks D46 and D48 constitute the RAID groups G2, G3, G4, and G5, respectively.

Additionally, the plurality of disks D included in the RAID apparatus 2 constitute thin provisioning pools. Disk capacity is aggregated and managed separately for each thin provisioning pool. In the example illustrated in FIG. 2, the plurality of disks D included in the two RAID groups G0 and G1 constitute a single thin provisioning pool P0. In addition, the disks D31 to D38 as well as the plurality of disks D included in the four RAID groups G2 to G5 constitute a single thin provisioning pool P1. Herein, it is assumed that a single thin provisioning pool comprises two or more RAID groups G.

The RAID controller 20 includes: channel adapters (CA) 200-1 and 200-2, which controls data transfer with respect to a host computer 9; a control unit 210; and disk interfaces (DI) 220-1 and 220-2, which controls data transfer with respect to the disks D. Meanwhile, the control unit 210 includes a virtual volume control unit 211, a virtual volume 212, a thin provisioning control unit 213, a storage unit 214, a RAID control unit 215, and a rebuild control unit 216. Furthermore, the storage unit 214 includes a RAID management table 214a and a list table 214b.

The RAID management table 214a stores management information for each RAID group. The RAID management table 214a will now be described with reference to FIG. 3. FIG. 3 illustrates one example of the data structure in the RAID management table 214a. As illustrated in FIG. 3, the RAID management table 214a stores the following in association with individual RAID group numbers 214a1: the assigned pool number 214a2, the RAID level 214a3, the number of member disks 214a4, and the member disks 214a5.

The RAID group number 214a1 is a number that identifies a particular RAID group inside the RAID controller 20. The assigned pool number 214a2 is the number of the pool to which that RAID group belongs. The RAID level 214a3 is the RAID level for that RAID group. The number of member disks 214a4 is a value indicating the number of disks D belonging to the RAID group. The member disks 214a5 indicates the number of each disk D belonging to the RAID group.

For each RAID group, the list table 214b manages the size of the storage area allocated to that RAID group according to host access. The list table 214b will now be described with reference to FIG. 4. FIG. 4 illustrates one example of the data structure in the list table 214b. As illustrated in FIG. 4, the list table 214b stores the following for each RAID group in an assigned pool: the assigned pool number 214b1, the RAID group number 214b2, the RAID group status 214b3, and the allocated storage area size 214b4.

The RAID group number 214b2 is a number that identifies a particular RAID group inside the RAID controller 20. The assigned pool number 214b1 is the number of the pool to which that RAID group belongs. Herein, it is assumed that a plurality of RAID groups belong to the same assigned pool. The RAID group status 214b3 indicates whether or not the RAID group is functioning normally (e.g., healthy). For example, if the disks belonging to the RAID group are all functioning normally, then the value "1" will be stored in the RAID group status 214b3, which indicates that the RAID group is healthy. In contrast, if even one of the disks has failed, then the value "0" will be stored in the RAID group status 214b3, which indicates that the RAID group is malfunctioning. The allocated storage area size 214b4 indicates the total number of storage area blocks inside the RAID group that have been allocated to the virtual volume according to host access.

Upon detecting a request from the host computer 9 to write new data to the virtual volume 212, the virtual volume control unit 211 associates the new data with a virtual area inside the virtual volume 212. The virtual volume 212 is a virtual storage unit accessed by the host computer 9, and refers to a thin provisioning volume. It should be appreciated that one virtual volume 212 may be presented to the host computer 9, or two or more virtual volumes 212 may be presented. Herein, the single virtual volume 212 is described as being a single virtual volume presented to the host computer 9.

The thin provisioning control unit 213 includes a RAID group determining unit 213a and a storage area allocator 213b. When a virtual area is allocated to the new data by the virtual volume control unit 211, the RAID group determining unit 213a selects a RAID group G that is other than any RAID groups G including a failed disk D. The selected RAID group is determined to be the group from which to allocate storage area. More specifically, the RAID group determining unit 213a selects a thin provisioning pool (hereinafter abbreviated to pool) with respect to the virtual volume 212. In addition, the RAID group determining unit 213a determines a RAID group G in accordance with the following conditions: the size of the storage area already allocated to the virtual volume should be smaller than that of the other RAID groups G within the selected pool; and all disks D within the RAID group G should be functioning normally.

More specifically, the RAID group determining unit 213a selects a RAID group number 214b2 from the list table 214b in order of smallest allocated storage area size 214b4. Subsequently, the RAID group determining unit 213a references the RAID group status 214b3 in the list table 214b to determine whether or not the RAID group G with the selected RAID group number 214b2 is healthy. In other words, the RAID group determining unit 213a determines whether or not there is a failure in any of the disks D included in the selected RAID group G. If the RAID group G with the selected RAID group number 214b2 is healthy, then the RAID group determining unit 213a determines that RAID group G to be the group from which to allocate storage area to the new data. In contrast, if the RAID group G with the selected RAID group number 214b2 is not healthy, then the RAID group determining unit 213a selects the RAID group number 214b2 with the next smallest allocated storage area size 214b4. This series of operations for determining a RAID group will be herein referred to as the RAID group determination process.

The storage area allocator 213b takes storage area from disks D existing inside the RAID group G that was determined by the RAID group determining unit 213a, and allocates that storage area to the virtual volume 212 according to the data size of the new data. In other words, the storage area allocator 213b reserves the storage area in the disks D existing within the RAID group G that was determined by the RAID group determining unit 213a, wherein the size of the storage area corresponds to the data size for the new data that was allocated in the virtual volume 212. The storage area allocator 213b then allocates the reserved storage area to the virtual area of the new data inside the virtual volume 212. Herein, the size of the storage area may correspond to the data size by being equal to the data size, or by being a sufficiently large storage area allocated in 32 MB units, for example, irrespectively of the data size.

The RAID control unit 215 accesses the disks D inside the RAID group according to the RAID level set for each RAID group. More specifically, the RAID control unit 215 writes the new data to the storage area that was allocated to the virtual volume 212 by the storage area allocator 213b. At this point, the RAID control unit 215 extracts, from the RAID management table 214a, the RAID level 214a3 for the RAID group G that was determined by the RAID group determining unit 213a, and writes the new data to the storage area according to the extracted RAID level.

In addition, upon detecting a failure in a disk D, the RAID control unit 215 transmits a rebuild request for the failed disk D to the rebuild control unit 216.

Upon receiving a rebuild request for a failed disk D from the RAID control unit 215, the rebuild control unit 216 rebuilds the failed disk D. More specifically, the rebuild control unit 216 reconstructs the data on a predetermined hot spare(HS).

Figure 5:
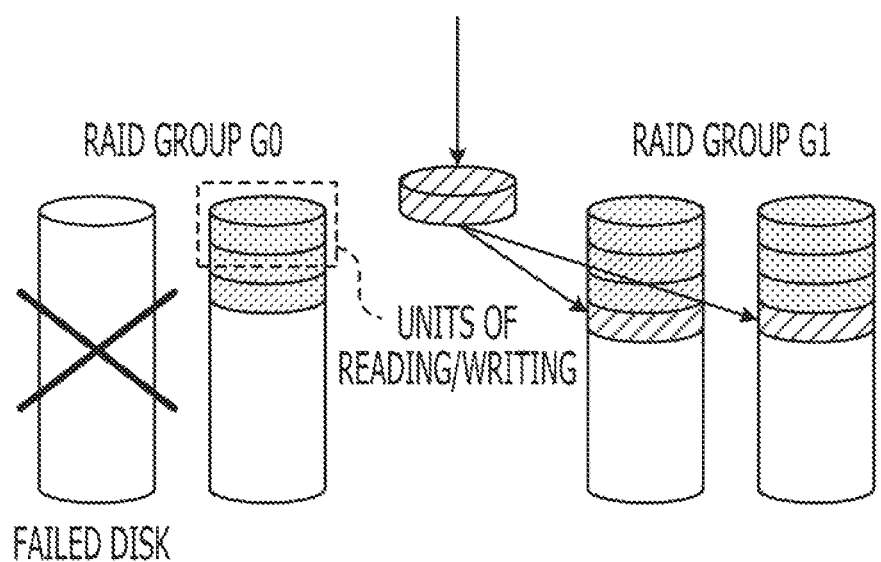
FIG. 5 is a diagram for explaining an example of storage area allocation.

A specific example of storage area allocation by the thin provisioning control unit 213 will now be described with reference to FIG. 5. FIG. 5 is a diagram for explaining a specific example of storage area allocation. Herein, the case of RAID groups with a RAID level of RAID 1 is described by way of example. Furthermore, the RAID group G0 is taken to include a failed disk, while the RAID group G1 is taken to include only healthy disks.

First, upon detecting a request from the host computer 9 to write new data to the virtual volume 212, the virtual volume control unit 211 associates the new data with a virtual area inside the virtual volume 212. Subsequently, on the basis of the assigned pool number, the virtual volume control unit 211 determines the pool associated with the virtual volume 212. The RAID group determining unit 213a then consults the list table 214b, and from among the RAID groups G in the determined pool, selects a RAID group number 214b2 in order of smallest allocated storage area size 214b4 with respect to the virtual volume 212. At this point, consider the case when the allocated storage area size 214b4 of the RAID group G0 is smaller than that of the RAID group G1. In this case, the RAID group determining unit 213a selects the RAID group G0.

However, since the RAID group G0 includes a failed disk, the RAID group determining unit 213a determines that the RAID group G0 is not healthy, and selects the RAID group G with the next smallest allocated storage area size 214b4. At this point, the RAID group determining unit 213a selects the RAID group G1. In so doing, the RAID group determining unit 213a determines that the selected RAID group G1 is healthy, and determines the RAID group G1 to be the group from which to allocate storage area to the new data.

Next, the storage area allocator 213b reserves a storage area in the disks D existing within the determined RAID group G1, wherein the size of the storage area corresponds to the data size of the new data that was allocated in the virtual volume 212. The storage area allocator 213b then allocates the reserved storage area to the virtual area of the new data inside the virtual volume 212.

In addition, the RAID control unit 215 writes the new data to the reserved storage area in the disks D inside the RAID group G1. The RAID group G1 is in a RAID 1configuration, and thus at this point the RAID control unit 215 writes substantially simultaneous the new data to the disk D where the storage area was reserved, as well as to its paired disk D.

[Storage Area Allocation Processing Sequence in Accordance with Embodiment 2]

Figure 6:
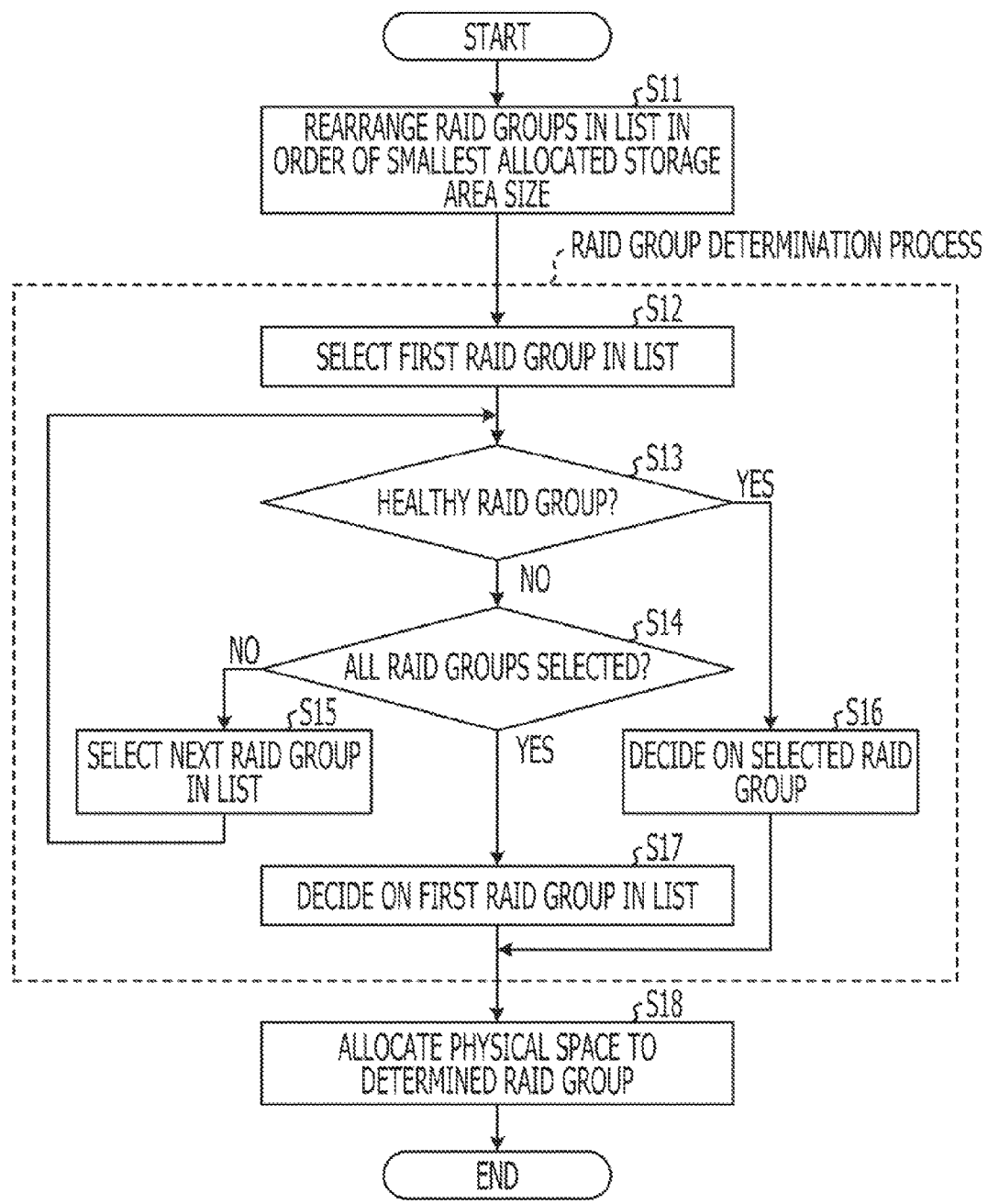
FIG. 6 is a flowchart illustrating a storage area allocation processing sequence in accordance with Embodiment 2.

A storage area allocation processing sequence in accordance with Embodiment 2 will now be described with reference to FIG. 6. FIG. 6 is a flowchart illustrating a storage area allocation processing sequence in accordance with Embodiment 2. Herein, it is assumed that the virtual volume control unit 211 has detected a new data write request from the host computer 9.

First, the virtual volume control unit 211 allocates a virtual area in the virtual volume 212 to the new data specified in the write request. The RAID group determining unit 213a then selects the pool number corresponding to the virtual volume 212.

Next, the RAID group determining unit 213a takes the RAID group numbers 214b2 in the list table 214b that correspond to the selected pool number, and rearranges the RAID group numbers 214b2 in order of smallest allocated storage area size 214b4 (e.g., ascending order) (S11). At this point, the RAID group determining unit 213a may also add sequence numbers to the list table 214b in association with the RAID group numbers 214b2, and maintain the sequence numbers in order of smallest allocated storage area size 214b4 (e.g., ascending order).

Subsequently, the RAID group determining unit 213a selects the first RAID group number 214b2 in the list table 214b that has been arranged in order of smallest allocated storage area size 214b4 (e.g., ascending order) (S12). In the case of a list table 214b maintaining sequence numbers in order of smallest allocated storage area size 214b4, the RAID group determining unit 213a selects the RAID group number 214b2 having the sequence number with the lowest value. Subsequently, the RAID group determining unit 213a determines whether or not the RAID group with the selected RAID group number 214b2 is healthy (S13).

If it is determined that the RAID group is not healthy (S13 No), then the RAID group determining unit 213a uses the list table 214b as a basis for determining whether or not all RAID groups belonging to the selected pool number have been selected (S14). If not all RAID groups have been selected (S14 No), then the RAID group determining unit 213a selects the next RAID group number 214b2 in the list table 214b (S15), and the process transitions to operation S13.

In contrast, if it is determined that the RAID group is healthy (S13 Yes), then the RAID group determining unit 213a determines the selected RAID group to be the group from which to allocate storage area to the new data (S16). Also, in the case where all RAID groups have been selected (S14 Yes), the RAID group determining unit 213a determines the RAID group with the RAID group number 214b2 that was first selected from the list table 214b to be the group from which to allocate storage area to the new data (S17).

Subsequently, the storage area allocator 213b allocates physical space to the determined RAID group G (S18). In other words, the storage area allocator 213b reserves storage area in the disks D existing within the RAID group G that was determined by the RAID group determining unit 213a, wherein the size of the storage area corresponds to the data size for the new data that was allocated in the virtual volume 212. The RAID control unit 215 then writes the new data to the physical space that was allocated by the storage area allocator 213b. At this point, the RAID control unit 215 writes the new data to the storage area in accordance with the RAID level of the RAID group G that was determined by the RAID group determining unit 213a.

[Advantages of Embodiment 2]

According to the above Embodiment 2, a RAID apparatus 2 is configured to include a list table 214b, which manages the sizes of the storage areas respectively allocated to each RAID group G. Using the allocated storage area sizes managed for each RAID group G by the list table 214b, the RAID group determining unit 213a of the RAID apparatus 2 selects a RAID group G whose allocated storage area size is smaller than those of the other RAID groups G. The RAID group determining unit 213a is also configured to determine a RAID group G such that all disks D within the selected RAID group G are healthy. Additionally, the storage area allocator 213b allocates a storage area to the virtual volume 212 from the disks D existing within the RAID group G that was determined by the RAID group determining unit 213a, wherein the size of the storage area corresponds to the data size of the new data.

According to such a configuration, the RAID group determining unit 213a allocates physical space to the virtual volume 212 from the RAID group G with the smallest allocated storage area size from among the RAID groups with all healthy disks D. For this reason, the RAID group determining unit 213a is able to avoid overly biasing a specific RAID group G when accessing the RAID groups G with all healthy disks D, thereby making it possible to substantially prevent reduction in the access performance of the RAID apparatus 2 as a whole.

Herein, by using the allocated storage area sizes managed for each RAID group G by the list table 214b, the RAID group determining unit 213a selects a RAID group G whose allocated storage area size is smaller than those of the other RAID groups G. The RAID group determining unit 213a is also configured to determine a RAID group G such that all disks D within the selected RAID group G are healthy. However, the RAID group determining unit 213a may also determine a RAID group G by first extracting RAID groups G with all healthy disks D from the list table 214b, and then determining the RAID group G with the smallest allocated storage area size from among the extracted RAID groups G.

In addition, the RAID apparatus 2 may be configured such that, once a RAID group including a failed disk has been recovered, data stored in a RAID group other than the affected RAID group at the time of failure may be restored to the recovered RAID group.

Embodiment 3

The RAID apparatus 2 in accordance with Embodiment 2 is described for the case wherein, upon being issued a request to write new data to a virtual volume to be accessed, physical space is allocated to the virtual volume from a RAID group that is other than any RAID groups including failed disks. However, the RAID apparatus 2 is not limited to the above, and may be additionally configured such that, when a disk failure occurs in mid-operation, the data on the RAID group that includes the failed disk is recovered onto physical space in a RAID group that is other than the affected RAID group. In other words, instead of recovering data from a RAID group that includes a failed disk to a HS, the RAID apparatus 2 may recover the data to physical space on a healthy RAID group.

Thus, Embodiment 3 describes the case where, when a disk failure occurs in mid-operation, a RAID apparatus 3 takes data from the RAID group that includes the failed disk, and recovers the data onto physical space in a RAID group that is other than the affected RAID group.

[Configuration of RAID Apparatus in Accordance with Embodiment 3]

Figure 7:
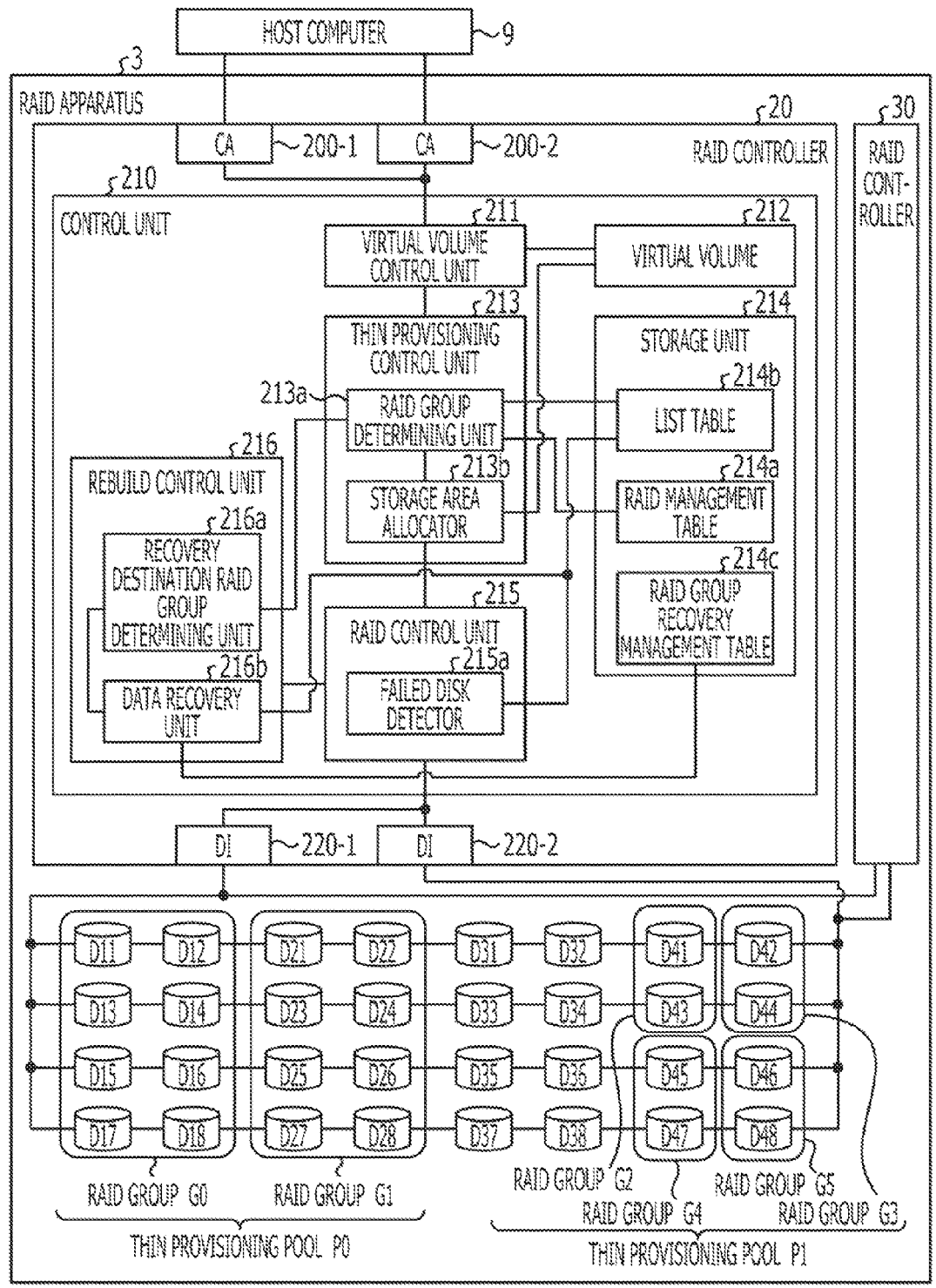
FIG. 7 is a function block diagram illustrating the configuration of a RAID apparatus in accordance with Embodiment 3.

FIG. 7 is a function block diagram illustrating the configuration of a RAID apparatus 3 in accordance with Embodiment 3. Herein, portions of the configuration that are substantially identical to that of the RAID apparatus 2 illustrated in FIG. 2 are indicated by identical reference numbers, and further description of the configuration and operation of such duplicated portions is herein omitted. Embodiment 3 differs from Embodiment 2 in that a failed disk detector 215a has been added to the RAID control unit 215, and a recovery destination RAID group determining unit 216a as well as a data recovery unit 216b have been added to the rebuild control unit 216. In addition, a RAID group recovery management table 214c has been added to the storage unit 214.

The failed disk detector 215a detects a disk D where a failure has occurred. In addition, the failed disk detector 215a stores the value "0" in the RAID group status 214b3 of the list table 214b, which indicates that the RAID group G that includes the detected failed disk D is malfunctioning. The failed disk detector 215a also issues instructions for recovery of the RAID group G to which the failed disk D belongs. More specifically, the failed disk detector 215a issues recovery instructions to the recovery destination RAID group determining unit 216a. The recovery instructions include the disk number of disk D where the failure occurred, the assigned pool number, and the assigned RAID group number.

The recovery destination RAID group determining unit 216a determines a recovery destination for data stored on the disks D within the failed group. Herein, the failed group refers to the RAID group G that includes the disk D where the failure occurred. The determined recovery destination is a RAID group G that is other than the failed group. More specifically, upon receiving recovery instructions from the failed disk detector 215a, the recovery destination RAID group determining unit 216a issues instructions to the RAID group determining unit 213a indicating the determined recovery destination for each data block stored in the disks D within the failed group. At this point, the recovery destination RAID group determining unit 216a issues recovery destination RAID group determination instructions that include the pool number of the pool to which the failed disk D belongs. Herein, a data block refers to a unit of information read and written with respect to a disk D.

Upon receiving recovery destination RAID group determination instructions from the recovery destination RAID group determining unit 216a, the RAID group determining unit 213a executes the RAID group determination process, and determines a RAID group G. In other words, the RAID group determining unit 213a determines a RAID group G by selecting a RAID group G from among the plurality of RAID groups G included in the pool indicated by the recovery destination RAID group determination instructions, wherein the selected RAID group G is other than the RAID group G that includes the disk D where the failure occurred.

The data recovery unit 216b takes data stored on the disks D within the failed group, and recovers the data onto the RAID group G that was determined by the recovery destination RAID group determining unit 216a. More specifically, the data recovery unit 216b reads out data stored on the disks D within the failed group, and writes the data to disks D within the RAID group G that was determined by the recovery destination RAID group determining unit 216a. In addition, the data recovery unit 216b pairs together and stores the following information in the RAID group recovery management table 214c: the location where the read out data had been stored, and the location where the read out data was written.

The RAID group recovery management table 214c will now be described with reference to FIG. 8. FIG. 8 illustrates one example of the data structure in the RAID group recovery management table 214c. As illustrated in FIG. 8, the RAID group recovery management table 214c stores failed RAID group data block information 214c1 as well as recovery destination RAID group data block information 214c2 in association with each data block. The failed RAID group data block information 214c1 indicates the data storage location within the failed group, and includes the RAID group number of the recovery destination RAID group G, the disk number of the disk D where the data block is stored, and the real address. In other words, in the failed RAID group data block information 214c1, the data recovery unit 216b stores the location where the data read out from the disk D within the failed group had been stored. In addition, in the recovery destination RAID group data block information 214c2, the data recovery unit 216b stores the location where the read out data was written. Herein, the real address may refer to a logical block address(LBA), for example, but the real address may be any address able to specify a location within a disk D. Also, although the above is configured to conduct data recovery management for each data block specified by a real address, data recovery management may also be conducted in units that group a plurality of data blocks together. In this case, each real address in the failed RAID group data block information 214c1 and the recovery destination RAID group data block information 214c2 may be replaced by a start address and a data size.

Returning to FIG. 7, once the data is recovered, the data recovery unit 216b updates the allocated storage area size 214b4 for both the recovery destination RAID group G and the failed group in the list table 214b.

Figure 9:
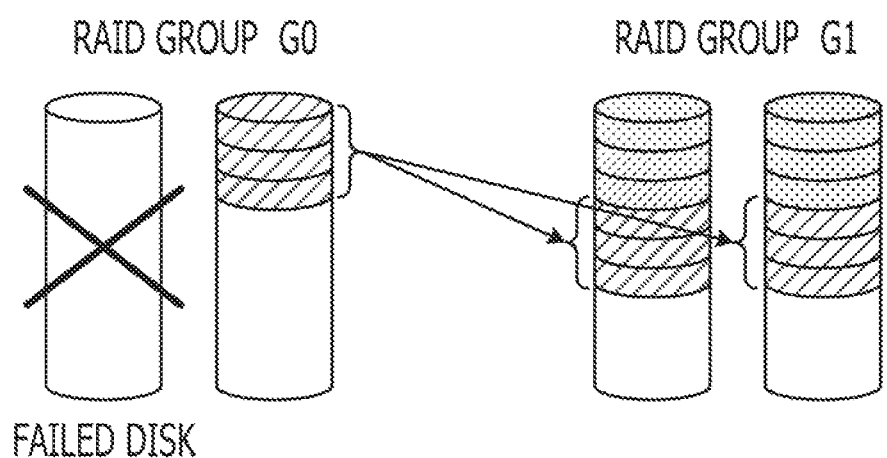
FIG. 9 is a diagram for explaining an example of data recovery.

A specific example of data recovery by the rebuild control unit 216 will now be described with reference to FIG. 9. FIG. 9 is a diagram for explaining a specific example of data recovery. By way of example, FIG. 9 illustrates the case when the RAID level of the RAID groups is RAID 1.

First, the failed disk detector 215a detects that a failure has occurred in a disk D within the RAID group G0, and issues instructions for the recovery of the RAID group G0 to the recovery destination RAID group determining unit 216a. In so doing, the recovery destination RAID group determining unit 216a issues instructions for determining a recovery destination RAID group G to the RAID group determining unit 213a. The RAID group determining unit 213a then executes the RAID group determination process, determines a RAID group G, and returns the process to the recovery destination RAID group determining unit 216a. In other words, the RAID group determining unit 213a determines a RAID group G by selecting the RAID group G1, which is among the plurality of RAID groups G, and is other than the RAID group G0 that includes the disk D where the failure occurred. In the example illustrated in FIG. 9, the recovery destination RAID group determining unit 216a determines the RAID group G1.

Next, the data recovery unit 216b takes data stored on the disks D within the RAID group G0, and recovers the data onto the RAID group G1 that was determined by the recovery destination RAID group determining unit 216a. In other words, the data recovery unit 216b reads out data stored on the healthy disks D within the RAID group G0, and writes the data to disks D within the RAID group G1. Herein, the data recovery unit 216b may select healthy disks D within the RAID group G0 on the basis of a table that manages the status of the disks D for each RAID group, for example.

[Data Recovery Processing Sequence in Accordance with Embodiment 3]

Figure 10:
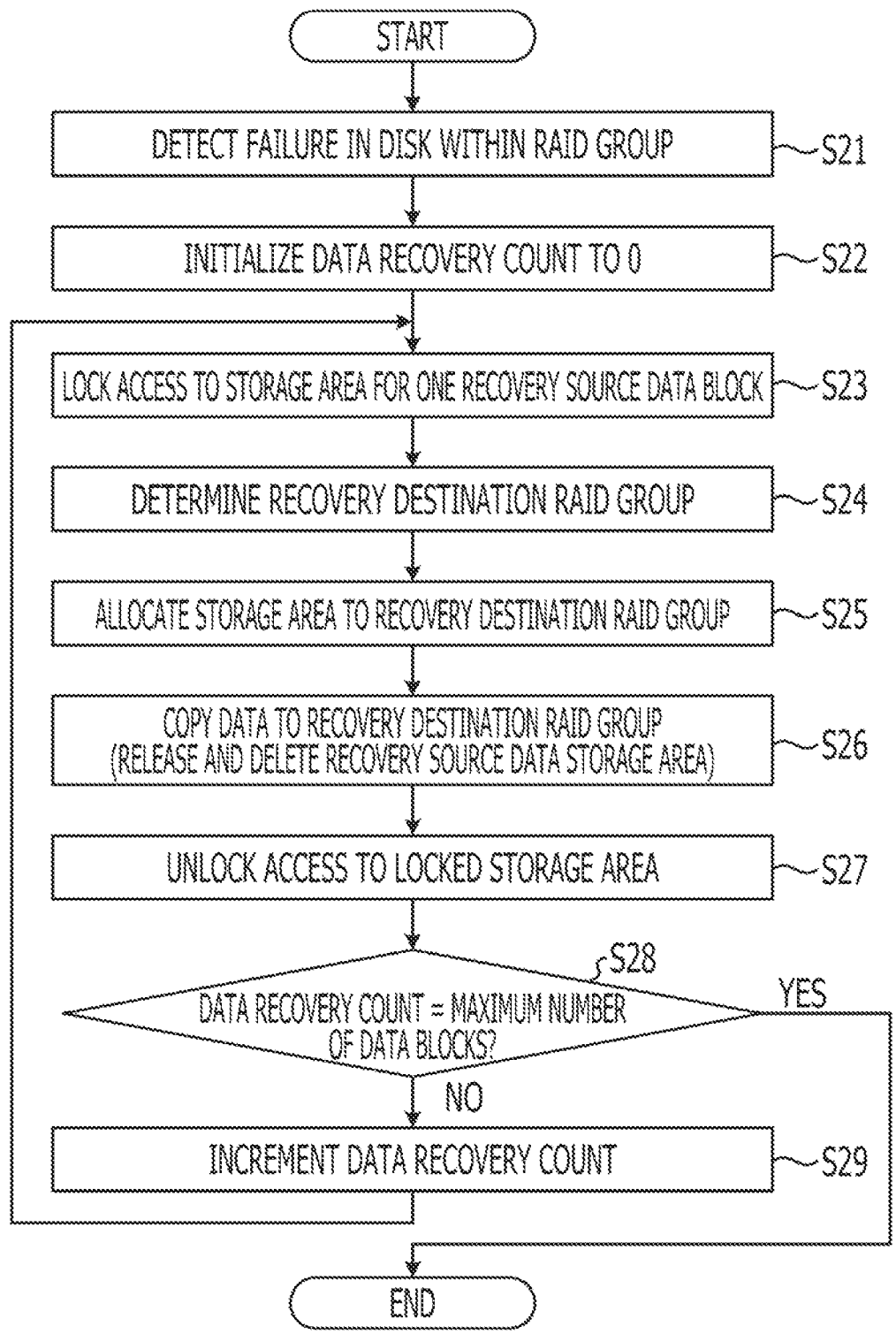
FIG. 10 is a flowchart illustrating a data recovery processing sequence in accordance with Embodiment 3.

Next, a data recovery processing sequence in accordance with Embodiment 3 will be described with reference to FIG. 10. FIG. 10 is a flowchart illustrating a data recovery processing sequence in accordance with Embodiment 3. In the RAID apparatus 3 herein, it is assumed that the disk D12 of the operating RAID group G0 has failed.

First, the failed disk detector 215a detects a failure in disk D12 of the RAID group G0 (S21), and issues instructions for the recovery of the RAID group G0 to the recovery destination RAID group determining unit 216a.

The recovery destination RAID group determining unit 216a then initializes a data recovery count to "0" (S22). The recovery destination RAID group determining unit 216a selects one recovery source data block from among the plurality of recovery source data blocks stored in the disks D within the RAID group G0, and locks access to the storage area of the selected recovery source data block (S23). This operation is conducted in order to substantially prevent the recovery source data block from being accessed during recovery and having its contents modified. Herein, the selected recovery source data block refers to a unit in which information is read and written.

Subsequently, the recovery destination RAID group determining unit 216a determines the recovery destination for the selected recovery source data block to be a RAID group G other than the RAID group G0 (S24). The data recovery unit 216*b* then reserves storage area in the disks D within the RAID group G that has been determined to be the recovery destination for the recovery source data block (S25), and copies the selected recovery source data block to the storage area (S26). At this point, the data recovery unit 216*b* deletes the recovery source data block from the storage area where the selected recovery source data block had been stored, and releases that storage area (S26). The data recovery unit 216*b* then unlocks access to the storage area of the selected recovery source data block (S27).

Subsequently, the recovery destination RAID group determining unit 216*a* determines whether or not the data recovery count is equal to the maximum number of recovery source data blocks (S28). If the data recovery count is determined to be equal to the maximum number of recovery source data blocks (S28 Yes), then the recovery destination RAID group determining unit 216*a* terminates the data recovery process. In contrast, if the data recovery count is determined to not be equal to the maximum number of recovery source data blocks (S28 No), then the recovery destination RAID group determining unit 216*a* increments the data recovery count (S29). The recovery destination RAID group determining unit 216*a* then transitions to operation S23 to recover the next recovery source data block.

[Advantages of Embodiment 3]

According to the above Embodiment 3, when a failure occurs in a disk D, the group G to which the failed disk D belongs is designated as a failed group by a recovery destination RAID group determining unit 216*a*. The recovery destination RAID group determining unit 216*a* then determines a recovery destination for the data stored in the disks D within the failed group by selecting a RAID group G that is other than the failed group. In addition, a data recovery unit 216*b* takes the data stored on the disks D within the failed group, and recovers the data onto the RAID group G that was determined by the recovery destination RAID group determining unit 216*a*.

According to such a configuration, the data recovery unit 216*b* takes the data stored on the disks D within the failed group, and recovers the data onto a RAID group G that is other than the failed group. In so doing, access to the failed group can be suppressed. For this reason, the RAID apparatus 3 no longer accesses the failed group after that point, and becomes able to avoid the extra load incurred by accessing a failed group. As a result, it becomes possible to substantially prevent reduced access performance in the RAID apparatus 3 as a whole.

Embodiment 4

The RAID apparatus 3 in accordance with Embodiment 3 is described for the case wherein, when a disk failure occurs in mid-operation, the data on the RAID group that includes the failed disk is recovered onto physical space in RAID group that is other than the affected RAID group. In other words, instead of taking data from a RAID group that includes a failed disk and recovering the data onto a HS, the RAID apparatus 3 takes the data from the RAID group that includes the failed disk and recovers the data onto a healthy RAID group. However, the RAID apparatus 3 is not limited to the above, and may also be configured such that, after taking data from the RAID group that includes the failed disk and recovering the data onto a healthy RAID group, the RAID apparatus 3 re-recovers the recovery data onto a RAID group that has been restored by maintaining recovery data.

Thus, Embodiment 4 describes the case where, after taking data from the RAID group that includes the failed disk and recovering the data onto a healthy RAID group, a RAID apparatus 4 re-recovers the data onto a RAID that has been restored by maintaining recovery data.

[Configuration of RAID Apparatus in Accordance with Embodiment 4]

Figure 11:
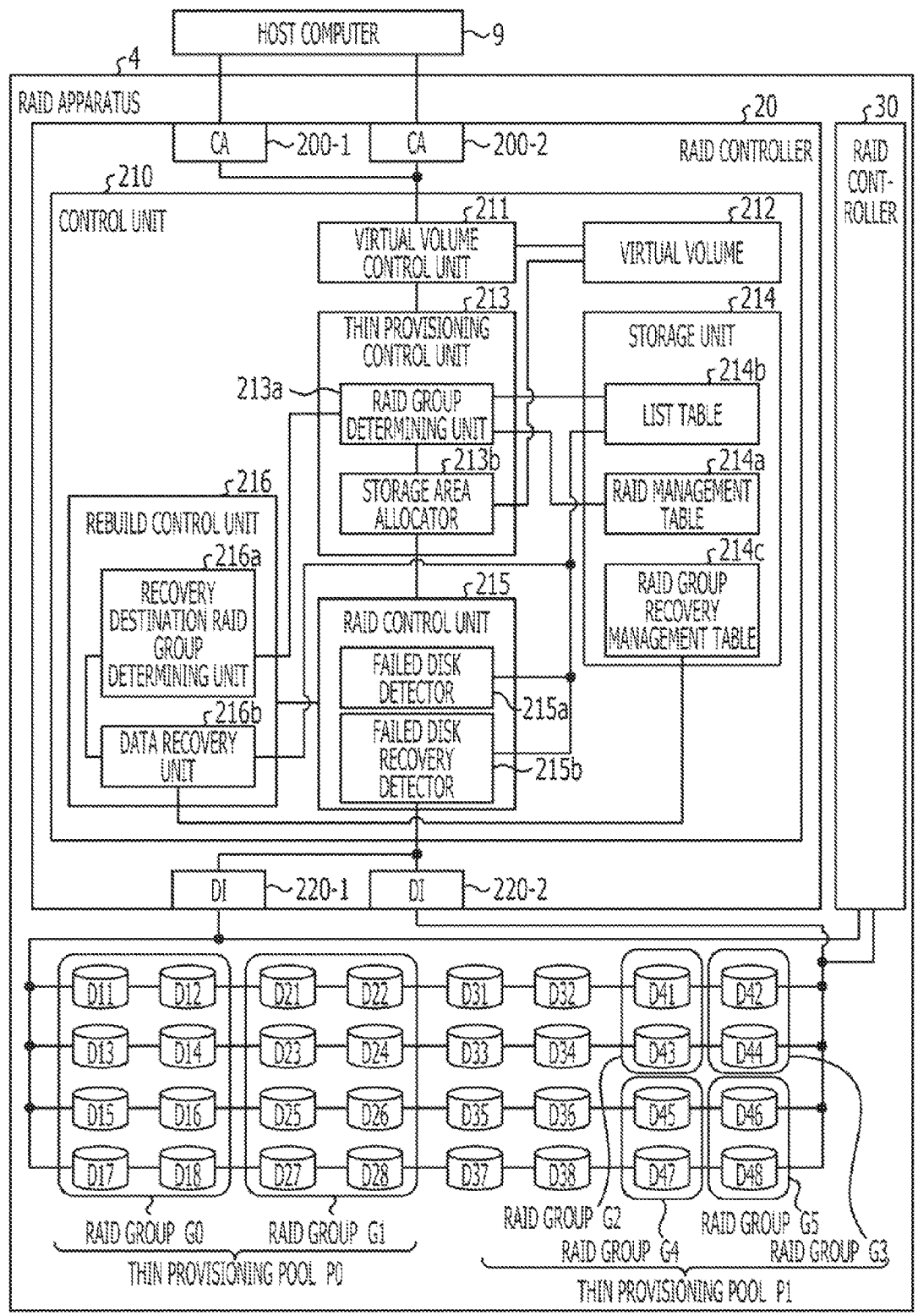
FIG. 11 is a function block diagram illustrating the configuration of a RAID apparatus in accordance with Embodiment 4.

FIG. 11 is a function block diagram illustrating the configuration of a RAID apparatus in accordance with Embodiment 4. Herein, portions of the configuration that are substantially identical to that of the RAID apparatus 3 illustrated in FIG. 7 are indicated by identical reference numbers, and further description of the configuration and operation of such duplicated portions is herein omitted. Embodiment 4 differs from Embodiment 3 in that a failed disk recovery detector 215*b* has been added to the RAID control unit 215.

The failed disk recovery detector 215*b* detects when a RAID group G that includes a failed disk D (e.g., a failed group) has been restored. In addition, the failed disk recovery detector 215*b* stores the value "1" in the RAID group status 214*b*3 of the list table 214*b*, which indicates that the restored RAID group G is functioning normally. The failed disk recovery detector 215*b* also issues instructions to the recovery destination RAID group determining unit 216*a* for recovery of the restored RAID group G. More specifically, the failed disk recovery detector 215*b* issues re-recovery instructions to the recovery destination RAID group determining unit 216*a*. The re-recovery instructions include the group number of the restored RAID group G and the pool number of the assigned pool P. Upon receiving re-recovery instructions from the failed disk recovery detector 215*b*, the recovery destination RAID group determining unit 216*a* determines the restored RAID group G to be the recovery destination.

The data recovery unit 216*b* takes the data that had been stored on the disks D within the failed group, and re-recovers the data onto the restored group. Herein, the restored group refers to the restored RAID group G. More specifically, the data recovery unit 216*b* takes the recovery data at the storage location indicated by the recovery destination RAID group data block information 214*c*2 in the RAID group recovery management table 214*c*, and copies the data to the storage location indicated by the failed RAID group data block information 214*c*1.

In further detail, the data recovery unit 216*b* extracts from the RAID group recovery management table 214*c* the recovery destination RAID group data block information 214*c*2 that corresponds to the failed RAID group data block information 214*c*1 including the RAID group number that matches the group number of the restored group. The data recovery unit 216*b* then reads out recovery data from the storage locations (e.g., the RAID group, disk number, and real address) in the data recovery destination indicated by the extracted recovery destination RAID group data block information 214*c*2, and writes the recovery data to the disks D within the restored group. At this point, the data recovery unit 216*b* may write the read out recovery data to the storage locations where the recovery data was originally stored. In other words, the data recovery unit 216*b* may write the recovery data to the storage locations indicated by the failed RAID group data block information 214*c*1.

Once the data has been re-recovered, the data recovery unit 216*b* updates the allocated storage area size 214*b*4 for both the recovery destination RAID group G and the restored group in the list table 214*b*.

Figure 12:
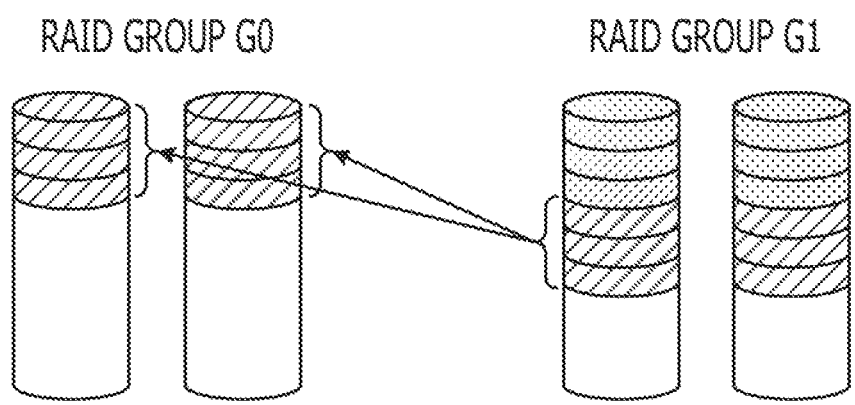
FIG. 12 is a diagram explaining an example of data re-recovery.

A specific example of data re-recovery by the rebuild control unit 216 will now be described with reference to FIG. 12. FIG. 12 is a diagram for explaining a specific example of data re-recovery. Herein, the RAID group G0 is taken to be the failed group, with the data on the RAID group G0 having been recovered onto the RAID group G1.

First, the failed disk recovery detector 215b detects that the RAID group G0 has been restored, and issues instructions for recovery of the restored RAID group G0 to the recovery destination RAID group determining unit 216a. In so doing, the recovery destination RAID group determining unit 216a determines the RAID group G0 to be the recovery destination.

Next, the data recovery unit 216b takes the data that had been stored on the disks D within the RAID group G0 (e.g., the failed group), and re-recovers the data onto the RAID group G0 that was determined by the recovery destination RAID group determining unit 216a. In other words, the data recovery unit 216b takes the recovery data that was recovered onto the RAID group G1 at the time of the failure, and recovers the data back onto the RAID group G0 (e.g., the restored group).

[Data Re-Recovery Processing Sequence in Accordance with Embodiment 4]

Next, a data re-recovery processing sequence in accordance with Embodiment 4 will be described with reference to FIG. 13. FIG. 13 is a flowchart illustrating a data re-recovery processing sequence in accordance with Embodiment 4. In the RAID apparatus 4 herein, it is assumed that the disk D12 of the operating RAID group G0 has failed, and that the data on the RAID group G0 has been recovered to a RAID group other than the RAID group G0.

First, the RAID apparatus 4 replaces the failed disk D12 (S31). During this replacement, no storage areas are allocated to the RAID group G0 that includes the replaced disk D12. Upon detecting that the RAID group G0 (e.g., the failed group) has been restored, the failed disk recovery detector 215b issues instructions for re-recovery of the RAID group G0 to the recovery destination RAID group determining unit 216a. In so doing, the recovery destination RAID group determining unit 216a determines the RAID group G0 to be the recovery destination.

Subsequently, the data recovery unit 216b initializes a data recovery count to "0" (S32). From the RAID group recovery management table 214c, the data recovery unit 216b extracts the recovery destination RAID group data block information 214c2 that corresponds to the failed RAID group data block information 214c1 including the RAID group number that matches that of the RAID group G0 (e.g., the restored group). The data recovery unit 216b takes the number of records in the extracted recovery destination RAID group data block information 214c2 to be equal to the maximum number of recovery source data blocks. The data recovery unit 216b then selects the storage area (e.g., the RAID group number, disk number, and real address) of one of the recovery source data blocks in the recovery destination RAID group data block information 214c2, and locks access to the selected storage area (S33). This is to substantially prevent the recovery source data block from being accessed during recovery and having its contents modified.

Subsequently, the data recovery unit 216b reserves storage area in the disks D within the RAID group G0 determined to be the recovery destination (S34), and copies the selected recovery source data to the storage area (S35). At this point, the data recovery unit 216b deletes the recovery source data block from the storage area where the selected recovery source data block had been stored, and releases that storage area. The data recovery unit 216b then unlocks access to the storage area of the selected recovery source data block (S36).

Subsequently, the data recovery unit 216b determines whether or not the data recovery count is equal to the maximum number of recovery source data blocks (S37). If the data recovery count is determined to be equal to the maximum number of recovery source data blocks (S37 Yes), then the data recovery unit 216b terminates the data re-recovery process. In contrast, if the data recovery count is determined to not be equal to the maximum number of recovery source data blocks (S37 No), then the data recovery unit 216b increments the data recovery count (S38). The data recovery unit 216b then transitions to operation S33 to re-recover the next recovery source data block.

[Advantages of Embodiment 4]

According to the above Embodiment 4, when a failure occurs in a disk D, the group G to which the failed disk D belongs is designated as a failed group by a recovery destination RAID group determining unit 216a. The recovery destination RAID group determining unit 216a then determines a recovery destination for the data stored in the disks D within the failed group by selecting a RAID group G that is other than the failed group. In addition, a data recovery unit 216b takes the data stored on the disks D within the failed group, and recovers the data onto the RAID group G that was determined by the recovery destination RAID group determining unit 216a. Furthermore, in the case where the failed group is restored, the data recovery unit 216b designates the failed group as a restored group, takes the data that had been stored on the disks D within the failed group, and re-recovers the data onto the restored group.

According to such a configuration, the data recovery unit 216b takes data that had been stored within the failed group and then restored onto a RAID group designated as the recovery destination, and re-recovers the data onto a RAID group designated as the restored group as a result of restoring the failed group. For this reason, the data recovery unit 216b is able to distribute the recovery data from the recovery destination RAID group to the restored group, thereby alleviating the frequency of access with respect to the recovery destination RAID group, and substantially preventing reduced access performance in the RAID apparatus 4 as a whole.

Herein, the data recovery unit 216b is described as taking all recovery data stored within the recovery destination RAID group and writing all of the data to the restored group, but the data recovery unit 216b is not limited thereto. In other words, the data recovery unit 216b may also be configured to write each recovery data block to a RAID group G determined by a RAID group determination process executed for each recovery data block. In this case, the recovery destination RAID group determining unit 216a may extract from the RAID group recovery management table 214c the recovery destination RAID group data block information 214c2 that corresponds to the failed RAID group data block information 214c1 including the RAID group number that matches the restored group number. The recovery destination RAID group determining unit 216a may then issue instructions to the RAID group determining unit 213a for determining a re-recovery destination for each record in the extracted recovery destination RAID group data block information 214c2 (e.g., for each recovery data block). The RAID group determining unit 213a may then determine a re-recovery destination for each recovery data block by the RAID group determination process. The data recovery unit 216b may then take each recovery data block stored in a storage area in the data recovery destination indicated by the recovery destination RAID group data block information 214c2, and re-recover the data at the re-recovery destination determined for that particular recovery data block. In so doing, the data recovery unit 216b is able to level out the allocation sizes of the physical space within all RAID groups, and substantially prevent reduced access performance in the RAID apparatus 4 as a whole.

[Other]

It should be appreciated that the individual component elements in the respective apparatus illustrated herein are not required to be physically configured in the manner illustrated in the drawings. In other words, the specific configuration in which individual apparatus are separated or integrated is not limited to that illustrated in the drawings, and all or part of the apparatus herein may be functionally or physically separated or integrated in arbitrary units according to particular factors, such as various load and usage conditions. For example, the virtual volume control unit 211 and the thin provisioning control unit 213 may be integrated as a single unit. On the other hand, in the RAID apparatus 4 in accordance with Embodiment 4, the recovery destination RAID group determining unit 216a may be separated into a recovery destination RAID group determining unit that determines the recovery destination RAID group, and a re-recovery destination RAID group determining unit that determines the re-recovery destination RAID group. In this case, the data recovery unit 216b may also be separated into a data recovery unit that recovers data to the recovery destination, and a data recovery unit that recovers data to the re-recovery destination. In addition, the storage unit 214 may be connected via a network as an external device with respect to the RAID apparatus 2 to 4.

In the foregoing embodiments, RAID apparatus that use disks as a storage device were described by way of example. However, it should be appreciated that the disclosed technology is not limited to the above, and is also applicable to embodiments that use arbitrary recording media.

In addition, all or an arbitrary portion of the respective processing functions carried out in the storage apparatus 1 and the RAID apparatus 2 to 4 may be realized by a central processing unit (CPU) (or microprocessor unit (MPU), microcontroller unit (MCU), or other microcomputer) as well as a program that is parsed and executed by the CPU (or MPU, MCU, or other microcomputer). Alternatively, all or an arbitrary portion of the respective processing functions may be realized in hardware by wired logic.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A storage apparatus for storing data comprising:
a plurality of physical media provided with storage areas to store data;
a storage group determining unit configured to determine, upon detecting a request to write new data to a virtual volume to be accessed, a storage group from which to allocate storage area by selecting a storage group from among a plurality of storage groups made up of the plurality of physical media, wherein the selected storage group is other than any storage groups that include a physical medium where a failure has occurred; and
a storage area allocator configured to allocate storage area on the physical media existing within the storage group that was determined by the storage group determining unit to the virtual volume, the size of the storage area corresponds to the data size of the new data, wherein
the storage group determining unit includes a storage area size manager configured to manage the sizes of the storage areas allocated to each storage group, and
the storage group determining unit is configured to determine a storage group including a data size smaller than data size of the other storage groups managed by the storage area size manager and all physical media within the storage group are functioning normally.

2. The storage apparatus according to claim 1, further comprising:
a recovery destination group determining unit configured to designate the storage group that includes the failed physical medium as a failed group, and determine a recovery destination for the data stored on the physical media within the failed group by selecting a storage group that is other than the failed group, when a failure has occurred in one of the physical media; and
a data recovery unit configured to take the data stored on the physical media within the failed group, and recover the data onto the storage group that was determined by the recovery destination group determining unit.

3. The storage apparatus according to claim 2, wherein once the failed group has been restored, the data recovery unit designates the failed group as a restored group, takes the data that was recovered onto the storage group determined by the recovery destination group determining unit, and re-recovers the data onto the restored group.

4. A storage apparatus controller comprising:
a storage group determining unit configured to determine, upon detecting a request to write new data to a virtual volume to be accessed, a storage group from which to allocate storage area by selecting a storage group from among a plurality of storage groups made up of a plurality of physical media, wherein the selected storage group is other than any storage groups that include a physical medium where a failure has occurred; and
a storage area allocator configured to allocate storage area on the physical media existing within the storage group that was determined by the storage group determining unit to the virtual volume, the size of the storage area corresponds to the data size of the new data, wherein
the storage group determining unit includes a storage area size manager configured to manage the sizes of the storage areas allocated to each storage group, and
the storage group determining unit is configured to determine a storage group including a data size smaller than data size of the other storage groups managed by the storage area size manager and all physical media within the storage group are functioning normally.

5. The storage apparatus controller according to claim 4, further comprising:
a recovery destination group determining unit configured such that, when a failure has occurred in one of the physical media, the recovery destination group determining unit designates the storage group that includes the failed physical medium as a failed group, and determines a recovery destination for the data stored on the physical media within the failed group by selecting a storage group that is other than the failed group; and
a data recovery unit configured to take the data stored on the physical media within the failed group, and recover the data onto the storage group that was determined by the recovery destination group determining unit.

6. The storage apparatus controller according to claim 5, wherein once the failed group has been restored, the data recovery unit designates the failed group as a restored group, takes the data that was recovered onto the storage group determined by the recovery destination group determining unit, and re-recovers the data onto the restored group.

7. A method for allocating storage area in a storage apparatus comprising:
upon detecting a request to write new data to a virtual volume to be accessed, determining a storage group from which to allocate storage area by selecting a storage group from among a plurality of storage groups made up of a plurality of physical media, wherein the selected storage group is other than any storage groups that include a physical medium where a failure has occurred; and allocating storage area to the virtual volume, wherein the allocated storage area is on the physical media existing within the storage group that was determined in the storage group determining, and wherein the size of the storage area corresponds to the data size of the new data, wherein
the storage group determining includes managing the sizes of the storage areas allocated to each storage group, and
in the storage group determining, a storage group is determined such that among the allocated storage area sizes managed for each storage group in the storage area size managing, the allocated storage area size of the selected storage group is smaller than the allocated storage area sizes of the other storage groups, and all physical media within the selected storage group are functioning normally.

8. The method for allocating storage area in a storage apparatus according to claim 7, further comprising:
when a failure has occurred in one of the physical media, designating the storage group that includes the failed physical medium as a failed group, and determining a recovery destination for the data stored on the physical media within the failed group by selecting a storage group that is other than the failed group; and
taking the data stored on the physical media within the failed group, and recovering the data onto the storage group that was determined in the recovery destination group determining.

9. The method for allocating storage area in a storage apparatus according to claim 8, wherein
once the failed group has been restored, the failed group is designated as a restored group, and the data that was recovered onto the storage group determined in the recovery destination group determining is re-recovered onto the restored group.

* * * * *